United States Patent
Perkins et al.

(10) Patent No.: US 8,182,134 B2
(45) Date of Patent: May 22, 2012

(54) MIXING SYSTEM FOR THERMOSET COMPOSITIONS INCLUDING STATIC AND ROTARY MIXERS

(75) Inventors: Dennis Randall Perkins, Woodinville, WA (US); Philip Lambert Thomas, Kirkland, WA (US); Shawn Renwick Peck, Woodinville, WA (US)

(73) Assignee: PRC De Soto International, Inc., Sylmar, CA (US)

( * ) Notice: Subject to any disclaimer, the term of this patent is extended or adjusted under 35 U.S.C. 154(b) by 2003 days.

(21) Appl. No.: 11/303,324

(22) Filed: Dec. 16, 2005

(65) Prior Publication Data

US 2007/0140051 A1    Jun. 21, 2007

(51) Int. Cl.
*B01F 13/10* (2006.01)
(52) U.S. Cl. .................................................. 366/158.5
(58) Field of Classification Search .... 366/155.1–158.5, 366/336–340
See application file for complete search history.

(56) References Cited

U.S. PATENT DOCUMENTS

| | | | | |
|---|---|---|---|---|
| 2,460,605 | A * | 2/1949 | Soissa | 222/14 |
| 4,018,426 | A * | 4/1977 | Mertz et al. | 366/160.3 |
| 4,162,128 | A * | 7/1979 | Ogden et al. | 366/158.5 |
| 4,366,307 | A | 12/1982 | Singh et al. | |
| 4,548,788 | A * | 10/1985 | Morris et al. | 422/109 |
| 5,174,651 | A * | 12/1992 | Gaddis | 366/332 |
| 5,650,173 | A * | 7/1997 | Ramstack et al. | 424/489 |
| 5,654,008 | A * | 8/1997 | Herbert et al. | 424/489 |
| 6,005,014 | A | 12/1999 | Blackwell et al. | |
| 6,326,413 | B1 | 12/2001 | Blackwell et al. | |
| 6,510,966 | B1 | 1/2003 | Perry et al. | |
| 6,517,232 | B1 | 2/2003 | Blue | |
| 6,705,757 | B2 * | 3/2004 | Lyons et al. | 366/348 |

FOREIGN PATENT DOCUMENTS

| | | |
|---|---|---|
| EP | 0132169 | 1/1985 |
| EP | 0952173 | 10/1999 |
| NL | 1002709 | 9/1997 |

OTHER PUBLICATIONS

PRC 4400 Technical Data sheet, PRC-Desoto International, Feb. 1999.

* cited by examiner

*Primary Examiner* — David Sorkin
(74) *Attorney, Agent, or Firm* — Alan G. Towner

(57) ABSTRACT

Systems for mixing thermoset compositions are disclosed. Methods for making thermoset compositions using such systems are also disclosed. The systems include a static mixer in combination with a rotary mixer for mixing base and curing agent components of the thermoset compositions.

20 Claims, 1 Drawing Sheet

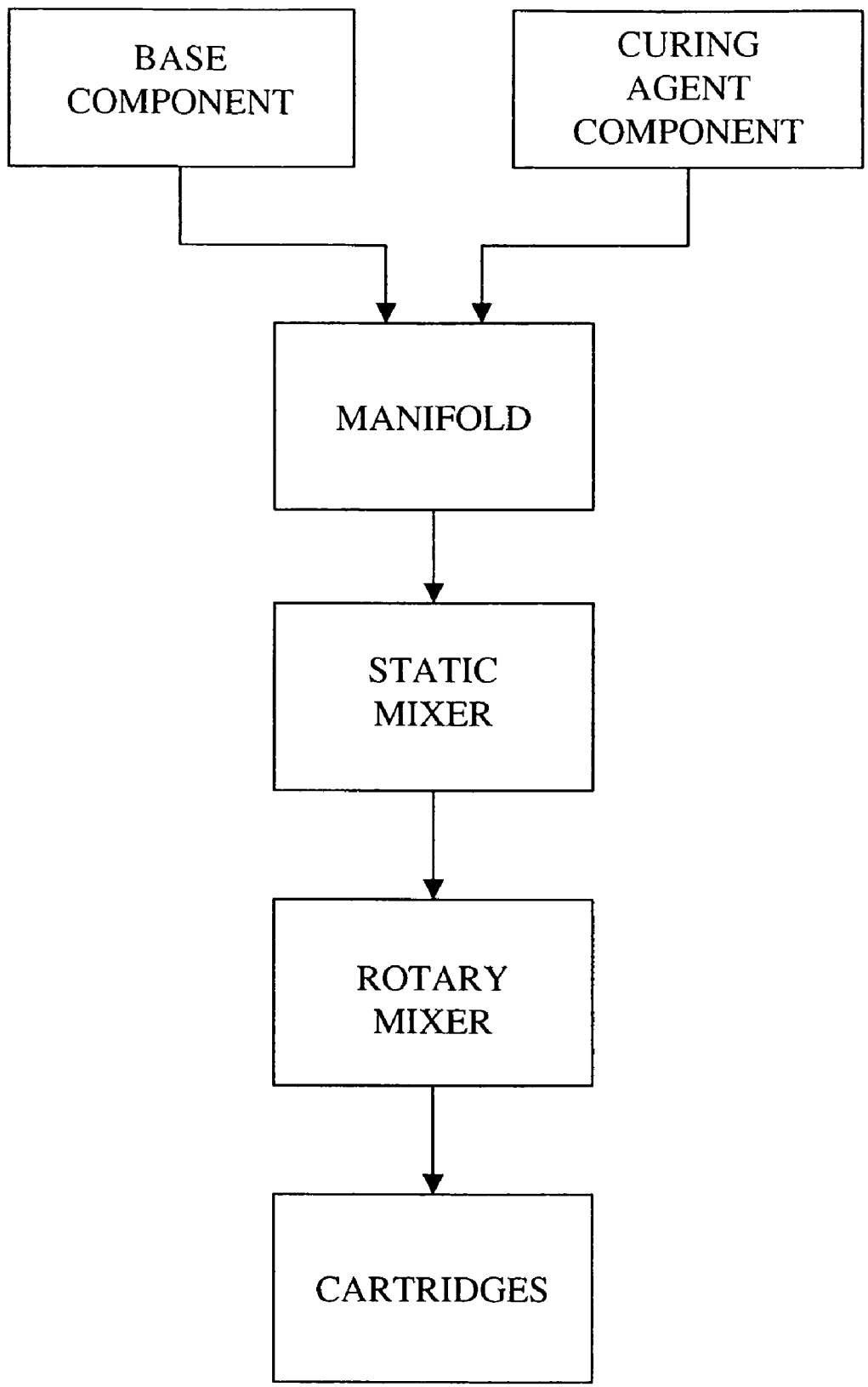

MIXING SYSTEM FOR THERMOSET COMPOSITIONS INCLUDING STATIC AND ROTARY MIXERS

FIELD OF THE INVENTION

The present invention relates to the production of thermoset compositions, and more particularly relates to a mixing system including static and rotary mixers which may be used to produce thermoset compositions such as sealants.

BACKGROUND INFORMATION

Thermoset compositions such as sealants may be made by mixing a base component with a curing agent, which initiates curing of the sealant. In some applications, it is desirable to delay curing of the composition for an extended period of time after the curing agent is mixed with the base material. For example, certain types of thermoset aerospace sealants are mixed and then stored at low temperatures in an uncured state until ready for use.

One approach for producing thermoset compositions is to mix the base material and curing agent in a rotary mixer. Another approach is to mix the base material and curing agent in a static mixer. Use of each of these mixers, however, can have drawbacks. Accordingly, improved methods for mixing thermoset compositions are desired.

SUMMARY OF THE INVENTION

The present invention provides systems for mixing thermoset compositions comprising: a static mixer comprising an inlet for base and curing agent components of the thermoset composition, and an outlet for the base and curing agent components; and a rotary mixer in fluid flow communication with the static mixer comprising an inlet for the base and curing agent components, and an outlet for the base and curing agent components.

The present invention further provides methods of mixing thermoset compositions, the methods comprising: mixing base and curing agent components of the thermoset composition in a static mixer; and mixing the base and curing agent components in a rotary mixer.

BRIEF DESCRIPTION OF THE DRAWINGS

FIG. 1 is a schematic flow diagram illustrating a system for producing a thermoset sealant composition from base and curing agent components utilizing static and rotary mixers in accordance with an embodiment of the present invention.

DETAILED DESCRIPTION

The present invention provides a mixing system including static and rotary mixers which are used to mix multiple components of thermoset compositions, such as base and curing agent components. Generally, base and curing agent components of the composition are fed through static and rotary mixers. In one embodiment, the base and curing agent components are first fed through a static mixer, such as a two-stage static mixer, and then through a rotary mixer which maintains the mixture at substantially ambient temperature. After passing through the static and rotary mixers, a finely mixed uncured thermoset composition is produced. In certain embodiments, the resultant mixture is stored in an uncured state at low temperature until ready for use. The system is particularly useful for mixing thermoset sealants for aerospace use. Although the production of such thermoset sealants is disclosed herein, the present system may also be used to improve the mix of other types of thermoset compositions.

As used herein, the term "static mixer" means a mixer having stationary mixing elements such as blades, rods and the like contained within a housing through which the base and curing agent components are fed. An example of a static mixer that may be used in accordance with the present invention is sold by TAH Industries, Inc. under the designation Series 100 mixers.

The term "rotary mixer" means a mixer including rotatable mixing elements such as blades, rods and the like contained within a housing through which the base and curing agent components are fed. An example of a suitable rotary mixer for use in accordance with the present invention is sold by Notron Mfg., Inc. under the designation Model 1383.

The terms "sealant," "sealing," "seal" and like terms as used herein refers to compositions that have the ability to resist atmospheric conditions such as moisture and temperature and at least partially block the transmission of materials such as water, fuel, and other liquids and gasses. Sealants often have adhesive properties, but are not simply adhesives because adhesives do not necessarily have the blocking properties of a sealant. The term "thermoset sealant" means a multi-component, crosslinked sealant which may have adhesive and/or insulating characteristics. "Multi-component" means two or more components. Thus, while the compositions of the present invention are being generally described herein as comprising a base component and a curing agent component, an additional component or components may also be used.

The term "base component" means any material that forms a thermoset composition upon mixture with a curing agent. Some examples of base components that may be mixed with curing agent components to produce thermoset compositions include polysulfide, polythioether, butyl, latex, acrylic, polyurethane and/or epoxy resins. Sulfur-containing polymers may be particularly suitable for use as the base component of the thermoset sealants of certain embodiments of the present invention.

The term "curing agent component" means any material that can be added to a base component to accelerate the curing of the base component. Curing agents are also known as accelerators, activators or cure pastes. In certain embodiments, the curing agent component is particularly reactive at a certain temperature range, for example, from 10° C. to 80° C. The term "reactive" means capable of chemical reaction and includes any level of reaction from partial to complete reaction of a reactant. In certain embodiments, a curing agent component is reactive when it provides for cross-linking of a base component such as a sulfur-containing polymer. Some examples of curing agent components include manganese dioxide, dichromate, mercaptan, amine, epoxy and hydroxyl, as well as other oxidizer or chain extending chemistries. For example, the curing agent component of a thermoset sealant composition may comprise manganese dioxide, dichromate, amine or mercaptan.

The ratio of base component to curing agent component may range from 20:1 to 1:1 by volume, typically from 20:1 to 5:1.

The base and curing agent, and any other components mixed according to the present invention, may optionally include other ingredients such as polymers, solvents, water, fillers (for body, weight, hardness, elongation, corrosion control, flow, slump and/or appearance), catalysts for controlling the rate of cure in final mixed product, flow control agents, colorants (particulates and/or dyes) and/or plasticizers. Such additional ingredients may be provided in any one or more of the components being mixed, or may themselves be a separate component.

FIG. 1 schematically illustrates a system for producing a thermoset sealant composition in accordance with an embodiment of the present invention. The base and curing agent components are delivered to a manifold which feeds the base and curing agent components to a static mixer. The base and curing agent components may be delivered to the manifold together or separately. After the base and curing agent components pass through the static mixer, they are fed to a rotary mixer where they undergo additional mixing. The mixed base and curing agent components may then be injected into standard cartridges in which the thermoset composition is stored until ready for use. This is particularly suitable when the composition is a sealant. Alternatively, the thermoset composition may be used immediately upon exiting the rotary mixer. In the embodiment shown in FIG. 1, the output of the static mixer is connected to the input of the rotary mixer. Alternatively, the base and curing agent components may be initially fed to the rotary mixer, followed by the static mixer.

The static mixer may include any standard design of stationary mixing blades contained within a tubular housing through which the base and curing agent components are fed. The static mixer housing may have an inside diameter of from 0.2 to 5 inches, typically from 0.3 to 3 inches. The static mixer typically has a total length of from 0.5 to 10 feet, for example, from 1 to 5 feet. Any suitable number of mixing elements may be used inside the static mixer. For example, from 5 to 30 mixing elements, typically from 12 to 24 mixing elements may be used.

In accordance with an embodiment of the present invention, the static mixer comprises two stages. In this embodiment, each stage may have an inside diameter of 0.5 to 1 inches, a length of 1 to 3 feet, and may contain 12 to 48 stationary mixing elements.

The base and curing agent components of the thermoset composition may be fed through the static mixer at a rate of from 1 to 30 cm³/second, typically at a rate of from 5 to 15 cm³/second.

The base and curing agent components may be introduced into the static mixer at a pressure of from 20 to 1,000 psi, typically from 50 to 500 psi.

The rotary mixer may include any standard design of a rotatable mixing blade mounted in a chamber through which the base and curing agent components of the composition are fed. The rotatable mixing blade has a diameter of from 1 to 6 inches, for example, from 2 to 5 inches. The rotatable mixing blade has a typical axial length of from 2 to 10 inches, for example, from 3 to 8 inches. The volume capacity of the rotary mixer typically ranges from 60 to 300 cm³.

The rotatable mixing blade of the rotary mixer is preferably rotated at a speed which does not cause significant temperature elevation of the base and curing agent components during the mixing operation, i.e., the base and curing agent components are maintained substantially at ambient or room temperature. For example, the rotatable mixing blade may be rotated at a speed of less than 100 rpm, typically less than 60 rpm. Thus, the rotatable mixing blade may be rotated at a speed of from 1 to 100 rpm, typically from 40 to 60 rpm.

The base and curing agent components may be introduced into the rotary mixer at a pressure of from 50 to 500 psi, typically from 100 to 300 psi.

The base and curing agent components typically pass through the rotary mixer at a rate of from 8 to 25 cm³/second, typically from 8 to 16 cm³/second.

In accordance with an embodiment of the present invention, after passing through the static and rotary mixers, the mixture is cooled in order to delay curing of the thermoset composition. For example, a thermoset composition may be cooled to a temperature at or below −20° C. or −40° C., for example, to a temperature at or below −50° C. or −60° C. It will be appreciated that the base and curing agent will not cure at these temperatures, and the composition can be brought to a temperature such as room temperature prior to use. This is particularly applicable when the composition is a sealant.

As noted above, in an embodiment of the invention, the base component comprises at least one sulfur-containing polymer. In addition, the base component may optionally include at least one plasticizer, at least one adhesion promoter, at least one corrosion inhibitor, at least one electrically non-conductive filler, at least one electrically conductive filler, and/or at least one adhesion promoter. Such additional ingredients may also be included in the curing agent component. In certain embodiments, the base component can comprise polysulfide polymers, polythioether polymers, oxidizing agents, additives, fillers, plasticizers, organic solvents, adhesion promoters, corrosion inhibitors and combinations thereof.

In certain embodiments, sulfur-containing polymers useful in the base component include polysulfide polymers that contain multiple sulfide groups, i.e., —S—, in the polymer backbone and/or in the terminal or pendent positions on the polymer chain. Such polymers are described in U.S. Pat. No. 2,466,963 wherein the disclosed polymers have multiple —S—S— linkages in the polymer backbone. Other useful polysulfide polymers are those in which the polysulfide linkage is replaced with a polythioether linkage, i.e.,

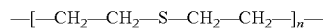

where n can be an integer ranging from 8 to 200 as described in U.S. Pat. No. 4,366,307. The polysulfide polymers can be terminated with non-reactive groups such as alkyl, although in certain embodiments, the polysulfide polymers contain reactive groups in the terminal or pendent positions. Typical reactive groups are thiol, hydroxyl, amino and vinyl. Such polysulfide polymers are described in the aforementioned U.S. Pat. Nos. 2,466,963, 4,366,307, and 6,372,849, each of which is incorporated herein by reference. Such polysulfide polymers can be cured with curing agents that are reactive with the reactive groups of the polysulfide polymer.

Sulfur-containing polymers used as base components in accordance with embodiments of the present invention can have number average molecular weights ranging from 500 to 8,000 grams per mole, and in certain embodiments, from 1,000 to 5,000 grams per mole, as determined by gel permeation chromatography using a polystyrene standard. For sulfur-containing polymers that contain reactive functional groups, the sulfur-containing polymers can have average functionalities ranging from 2.05 to 3.0, and in certain embodiments ranging from 2.1 to 2.6. A specific average functionality can be achieved by suitable selection of reactive components. Examples of sulfur-containing polymers include those available from PRC-DeSoto International, Inc. under the trademark PERMAPOL, specifically, PERMAPOL P-3.1 or PERMAPOL P-3, and from Akros Chemicals, such as THIOPLAST G4.

A sulfur-containing polymer can be present in the base component in an amount ranging from 10% to 40% by weight of the total weight of the base component, and in certain embodiments can range from 20% to 30% by weight. In certain embodiments, described below, wherein a sulfur-containing polymer comprises a combination of a polysulfide polymer and a polythioether polymer, the amount of polysulfide polymer and polythioether polymer can be similar. For example, the amount of polysulfide polymer and the amount of polythioether polymer in a base component can each range from 10% by weight to 15% by weight of the total weight of the base component.

In accordance with an embodiment of the present invention, the base component may comprise a polymer blend including at least one polysulfide and at least one polythioether. In this embodiment, the polysulfide polymers may have two or more sulfur-sulfur linkages. Suitable polysulfides are commercially available from Akzo Nobel under the name THIOPLAST. THIOPLAST products are available in a wide range of molecular weights ranging, for example, from less than 1100 to over 8000, with molecular weight being the average molecular weight in grams per mole. Particularly suitable is a number average molecular weight of 1000 to 4000. In some embodiments, it is desired to use a combination of polysulfides to achieve the desired molecular weight and/or crosslink density in the polymer blend. Different molecular weights and/or crosslink densities can contribute different characteristics to the blend and compositions incorporating the blend. For example, blends wherein the polysulfide component comprises more than one polysulfide polymer and one of the polysulfide polymers has a molecular weight of approximately 1000 have desirable non-crystallization properties.

In accordance with this embodiment, the polythioether is a polymer comprising at least one polythioether linkage, i.e., —[—$CH_2$—$CH_2$—S—$CH_2$—$CH_2$—]—. Typical polythioethers have from 8 to 200 of these linkages. Polythioethers suitable for use in the present invention include those described in U.S. Pat. No. 6,372,849. Suitable polythioethers typically have a number average molecular weight of 1000 to 10,000, such as 2,000 to 5,000, or 3,000 to 4,000. In some embodiments, the polythioether component will be terminated with non-reactive groups, such as alkyl, and in other embodiments will contain reactive groups in the terminal or pendant positions. Typical reactive groups are thiol, hydroxyl, amino, vinyl and epoxy. For a polythioether component that contains reactive functional groups, the average functionality typically ranges from 2.05 to 3.0, such as from 2.1 to 2.6. A specific average functionality can be achieved by suitable selection of reactive ingredients. Examples of suitable polythioethers are available from PRC-Desoto International, Inc., under the trademark PERMAPOL, such as PERMAPOL P-3.1E or PERMAPOL P-3. As with the polysulfide component, combinations of polythioethers can be used to prepare the polythioether component.

The curing agent component comprises at least one curing agent and in certain embodiments may also contain at least one plasticizer, at least one filler and/or at least one cure accelerator. In certain embodiments, the curing agent component can comprise curing agents, cure accelerators, cure retardants, plasticizers, additives, fillers and combinations thereof.

The amount of curing agent in a curing agent component can range from 25% by weight to 75% by weight of the total weight of the curing agent component. Additives such as sodium stearate can also be included to improve the stability of the accelerator.

Cure accelerators or retardants can also be used, such as a dimethylene/thiuram/polysulfide mixture cure accelerator or a stearic acid cure retarder, which will retard the rate of cure thereby extending the "pot life" of the composition. To control the properties of the composition, one or more materials capable of at least partially removing moisture from the composition, such as molecular sieve powder. For example, cure accelerants such as dipentamethylene/thiuram/polysulfide mixture can be included in a sealant composition to accelerate the rate of cure, and/or at least one cure retardant such as stearic acid can be added to retard the rate of cure and thereby extend the work life of a sealant composition during application. In certain embodiments, the curing agent component can comprise an amount of accelerant ranging from 1% to 7% by weight, and/or an amount of cure retardant ranging from 0.1% to 1% by weight, based on the total weight of the curing agent component. In certain embodiments, a curing agent component can comprise an amount of material capable of at least partially removing moisture ranging from 0.1% to 1.5% by weight, based on the total weight of the curing agent component.

In certain embodiments, the thermoset compositions of the present disclosure can comprise fillers. As used herein, "filler" refers to a substantially non-reactive component in the thermoset composition that provides a desired property, such as, for example, electrical conductivity, density, viscosity, mechanical strength, EMI/RFI shielding effectiveness, and the like. Examples of electrically non-conductive fillers include materials such as, but not limited to, calcium carbonate, mica, polyamide, fumed silica, molecular sieve powder, microspheres, titanium dioxide, chalks, alkaline blacks, cellulose, zinc sulfide, heavy spar, alkaline earth oxides, alkaline earth hydroxides, and the like. Conductive fillers include high band gap materials such as zinc sulfide and inorganic barium compounds.

Fillers used to impart electrical conductivity and EMI/RFI shielding effectiveness to polymer compositions are well known and can also be used in the present thermoset compositions. Examples of electrically conductive fillers include electrically conductive noble metal-based fillers such as pure silver; noble metal-plated noble metals such as silver-plated gold; noble metal-plated non-noble metals such as silver plated cooper, nickel or aluminum, for example, silver-plated aluminum core particles or platinum-plated copper particles; noble-metal plated glass, plastic or ceramics such as silver-plated glass microspheres, noble-metal plated aluminum or noble-metal plated plastic microspheres; noble-metal plated mica; and other such noble-metal conductive fillers. Non-noble metal-based materials can also be used and include, for example, non-noble metal-plated non-noble metals such as copper-coated iron particles or nickel plated copper; non-noble metals, e.g., copper, aluminum, nickel, cobalt; non-noble-metal-plated-non metals, e.g., nickel-plated graphite and non-metal materials such as carbon black, graphite and graphitized carbon. Combinations of electrically conductive fillers can also be used to meet the desired conductivity, EMI/RFI shielding effectiveness, hardness, and/or other properties suitable for a particular application.

In certain embodiments, the thermoset compositions comprise plasticizers such as phthalate esters, chlorinated paraffins, hydrogenated terphenyls, partially hydrogenated terphenyls, and the like. A thermoset composition can comprise more than one plasticizer. The amount of plasticizer in the base component can range from 0.1% to 5% by weight based on the total weight of the base component, and in certain embodiments, can range from 0.5% to 3% by weight. The amount of plasticizer in the curing agent component can range from 20% to 60% by weight of the total weight of the curing agent component, and in certain embodiments, can range from 30% to 40% by weight.

In certain embodiments, the thermoset compositions further comprise an organic solvent, such as a ketone or an alcohol, for example methyl ethyl ketone, and isopropyl alcohol, or a combination thereof.

In certain embodiments, the thermoset compositions comprise adhesion promoters such as, for example, phenolic resin, silane adhesion promoter, and combinations thereof. Adhesion promoters can facilitate adhesion of the polymeric components of the thermoset composition to a substrate, as well as to the electrically non-conductive and electrically conductive fillers in the thermoset composition. In certain embodiments, the thermoset composition can comprise from 0.15% to 1.5% by weight of a phenolic adhesion promoter, from 0.05% to 0.2% by weight of a mercapto-silane adhesion promoter and from 0.05% to 0.2% by weight of an epoxy-silane adhesion promoter. The total amount of adhesion promoter in the thermoset composition can range from 0.5% to 7% by weight, based on the total weight of the base component.

Some examples of suitable adhesion promoters include phenolics such as METHYLON phenolic resin available from Occidental Chemicals, organosilanes such as epoxy, mercapto or amino functional silanes such as A-187 and A-1100 available from Osi Specialties.

The thermoset compositions of the present invention can also optionally include other additives standard in the art, such as pigments, thixotropes, and masking agents. Useful pigments include those conventional in the art, such as carbon black and metal oxides. Pigments can be present in an amount from about 0.1 to about 10 weight percent based upon total weight of the formulation. Thixotropes, for example fumed silica or carbon black, can be used in an amount from about 0.1 to about 5 weight percent based upon total weight of the formulation.

The following example illustrates various aspects of the present invention, and is not intended to limit the scope of the invention.

EXAMPLE

A thermoset aerospace sealant composition was made as follows. A polysulfide base component and a manganese dioxide curing agent component were delivered to a manifold in a base:curing agent volume ratio of 100:8. The base and curing agent components were delivered from the manifold to the inlet of a two-stage static mixer comprising a Model #100-812 mixer sold by TAH Industries, Inc. Each stage of the static mixer comprised a tube having an internal diameter of 1.0 inch and a length of 1.5 feet. Each stage of the static mixer included 12 stationary mixing elements in the form of blades having a spiral shape. The outlet end of the static mixer first stage was connected directly to the inlet end of the static mixer second stage. The base and curing agent components were delivered to the static mixer at a pressure of 300 psi, and traveled through the static mixer at a rate of 30 $cm^3$/second. The outlet of the static mixer was connected to the inlet of a rotary mixer manufactured by Notron Mfg. under the name Model 1383. The rotary mixer had a circular-shaped rotatable mixing blade having a diameter of 4.5 inches and an axial length of 4.0 inches. The rotatable mixing blades were rotated at a speed of 50 rpm, and the base and curing agent components were maintained substantially at room temperature at this rotational speed. The base and curing agent components traveled through the rotary mixer at a rate of about 15 $cm^3$/second. Upon exiting the rotary mixer, the mixture was injected into tubular-shaped canisters. Each canister had a capacity of 1 to 12 fluid oz. During the canister-filling operation, the canisters are held in a bath at a temperature of −60° C. Thereafter, the filled canisters are stored in a freezer at a temperature of −45° C. The canisters may be stored at such low temperatures until ready for use. The sealant may be used as an aerospace sealant by the applying the sealant with a caulking-type gun to various aircraft surfaces.

It is noted that, as used in this specification and the appended claims, the singular forms "a", "an", and "the" include plural referents unless expressly and unequivocally limited to one referent. Thus, for example, reference to "a filler" includes one or more fillers, "a mixer" includes one or more mixers, and the like. Also it is noted that, as used herein, the term "polymer" is meant to refer to prepolymers, polymers, oligomers, homopolymers and copolymers.

For the purposes of this specification and appended claims, unless otherwise indicated, all numbers expressing quantities of ingredients or percentages or proportions of other materials, reaction conditions, and so forth used in the specification and claims are to be understood as being modified in all instances by the term "about". Accordingly, unless indicated to the contrary, the numerical parameters set forth in the following specification and attached claims are approximations that may vary depending upon the desired properties sought to be obtained by the present invention. At the very least, and not as an attempt to limit the application of the doctrine of equivalents to the scope of the claims, each numerical parameter should at least be construed in light of the number of reported significant digits and by applying ordinary rounding techniques.

Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard deviation found in their respective testing measurements. Moreover, all ranges disclosed herein are to be understood to encompass any and all sub-ranges subsumed therein. For example, a range of "10 to 50" includes any and all sub-ranges between (and including) the minimum value of 10 and the maximum value of 50, that is, any and all sub-ranges having a minimum value of equal to or greater than 10 and a maximum value of equal to or less than 50, e.g., 25 to 50.

Whereas particular embodiments of this invention have been described above for purposes of illustration, it will be evident to those skilled in the art that numerous variations of the details of the present invention may be made without departing from the invention as defined in the appended claims.

What is claimed is:

1. A system for mixing thermoset compositions comprising:
    a source of a base component of the thermoset composition;
    a source of a curing agent component of the thermoset composition;
    a static mixer comprising an inlet in fluid flow communication with the sources of the base and curing agent components of the thermoset composition, and an outlet for the base and curing agent components; and
    a rotary mixer in fluid flow communication with the static mixer comprising an inlet in fluid flow communication with the sources of the base and curing agent components, and an outlet for the base and curing agent components.

2. The system of claim 1, wherein the static mixer outlet is connected to the rotary mixer inlet.

3. The system of claim 1, wherein the thermoset composition is cooled after the base and curing agent components have passed through the static and rotary mixers.

4. The system of claim 3, wherein the thermoset composition is cooled to a temperature of less than −40° C.

5. The system of claim 1, wherein the thermoset composition is injected into cartridges after the base and curing agent components have passed through the static and rotary mixers.

6. The system of claim 1, wherein the thermoset composition comprises a sealant.

7. The system of claim 1, wherein the base component comprises a sulfur-containing polymer.

8. The system of claim 1, wherein the curing agent component comprises manganese dioxide.

9. A method of mixing thermoset compositions, the method comprising:
   providing a source of a base component of the thermoset composition;
   providing a source of a curing agent component of the thermoset composition;
   providing a static mixer comprising an inlet and an outlet in fluid flow communication with the sources of the base and curing agent components for mixing the base and curing agent components of the thermoset composition in the static mixer; and
   providing a rotary mixer in fluid flow communication with the static mixer comprising an inlet and an outlet in fluid flow communication with the sources of the base and curing components for mixing the base and curing agent components in the rotary mixer.

10. The method of claim 9, wherein the base and curing agent components are first introduced into the static mixer and then introduced into the rotary mixer.

11. The method of claim 9, wherein the base and curing agent components are introduced into the static mixer together.

12. The method of claim 9, wherein the base and curing agent components are passed through the static mixer at a rate of from 1 to 30 cm$^3$/second.

13. The method of claim 9, wherein the base and curing agent components are introduced into the static mixer at a pressure of from 20 to 1,000 psi.

14. The method of claim 9, wherein the base and curing agent components are introduced into the rotary mixer at a pressure of from 50 to 500 psi.

15. The method of claim 9, wherein the base and curing agent components are passed through the rotary mixer at a rate of from 8 to 25 cm$^3$/second.

16. The method of claim 9, wherein the base and curing agent components are maintained at substantially ambient temperature when they are mixed in the static and rotary mixers.

17. The method of claim 9, further comprising cooling the thermoset composition after the base and curing agent components have been mixed in the static and rotary mixers.

18. The method of claim 17, wherein the thermoset composition is cooled to a temperature below −40° C.

19. The method of claim 9, further comprising injecting the thermoset composition into cartridges after the base and curing agent components have been mixed in the static and rotary mixers.

20. The method of claim 9, wherein the thermoset composition comprises a sealant.

* * * * *